US012624985B2

(12) United States Patent
Oda

(10) Patent No.: US 12,624,985 B2
(45) Date of Patent: May 12, 2026

(54) BALANCE INCLUDING DOUBLE WINDSHIELD

(71) Applicant: A&D COMPANY, LIMITED, Tokyo (JP)

(72) Inventor: Hisanori Oda, Saitama (JP)

(73) Assignee: A&D COMPANY, LIMITED, Tokyo (JP)

( * ) Notice: Subject to any disclaimer, the term of this patent is extended or adjusted under 35 U.S.C. 154(b) by 411 days.

(21) Appl. No.: 18/567,349

(22) PCT Filed: Jun. 28, 2021

(86) PCT No.: PCT/JP2021/024292
§ 371 (c)(1),
(2) Date: Dec. 5, 2023

(87) PCT Pub. No.: WO2023/275915
PCT Pub. Date: Jan. 5, 2023

(65) Prior Publication Data
US 2024/0271989 A1      Aug. 15, 2024

(51) Int. Cl.
*G01G 21/28* (2006.01)

(52) U.S. Cl.
CPC ................................... *G01G 21/286* (2013.01)

(58) Field of Classification Search
CPC .................................................. G01G 21/286
See application file for complete search history.

(56) References Cited

U.S. PATENT DOCUMENTS

| | | | | | |
|---|---|---|---|---|---|
| 4,700,793 | A | * | 10/1987 | Luchinger | G01G 21/286 |
| | | | | | 177/238 |
| 4,893,686 | A | * | 1/1990 | Chretien | G01G 21/286 |
| | | | | | 177/180 |
| 5,298,688 | A | * | 3/1994 | Luechinger | G01G 21/286 |
| | | | | | 177/181 |
| 2013/0333957 | A1 | | 12/2013 | Feldotte et al. | |
| 2014/0290140 | A1 | * | 10/2014 | Kuhlmann | G01G 21/286 |
| | | | | | 49/404 |

(Continued)

FOREIGN PATENT DOCUMENTS

| | | | | | |
|---|---|---|---|---|---|
| CH | 678570 | A5 | * | 9/1991 | .......... G01G 21/286 |
| JP | H05-073541 | U | | 10/1993 | |

(Continued)

*Primary Examiner* — Natalie Huls

(74) *Attorney, Agent, or Firm* — Studebaker Brackett PLLC

(57) ABSTRACT

The balance includes the double windshield including an inner windshield that covers a weighing pan, and an outer windshield that covers the inner windshield, the respective windshields include sliding doors openable and closable on a lateral surface, a pair of engagement members configured to link sliding doors positioned on the same lateral surface side of the respective windshields so as to move in the same direction are provided, a protrusion is provided on one engagement member, and a recess is provided in the other engagement member, the protrusion is configured to enter into and exit from the recess, when the protrusion enters into the recess, the pair of engagement members is brought into an engaged state, and in such an engaged state, the sliding doors are linked together to be capable of opening and closing simultaneously.

4 Claims, 13 Drawing Sheets

(56)                    References Cited

U.S. PATENT DOCUMENTS

| | | | |
|---|---|---|---|
| 2023/0113500 A1* | 4/2023 | Oda | G01G 21/30 |
| | | | 177/180 |
| 2023/0304848 A1* | 9/2023 | Oda | G01G 21/22 |
| 2025/0305867 A1* | 10/2025 | Oda | G01G 21/286 |

FOREIGN PATENT DOCUMENTS

| | | |
|---|---|---|
| JP | H05-322638 A | 12/1993 |
| JP | H07-324970 A | 12/1995 |

* cited by examiner

BALANCE INCLUDING DOUBLE WINDSHIELD

TECHNICAL FIELD

The present invention relates to a balance, and particularly a balance including a double windshield that is suitable for a high-resolution balance.

BACKGROUND ART

A windshield is conventionally provided for a balance in order to prevent wind pressure from adversely affecting weighing. The flow of air around a weighing pan, for example, the air from an air conditioner, the breath of a person in weighing, the flow of air generated when a person walks, and the like act as wind pressure on a load-applied part with the weighing pan as the center. In the windshield, an opening is provided for placing a sample to be weighed on the weighing pan, and a sliding door for opening and closing the opening is usually provided. However, also when the sliding door is opened and closed, a flow of air is generated. Although this flow of air attenuates while moving inside the windshield after the sliding door is closed, the flow of air adversely affects weighing when it hits the weighing pan in this moving process, thereby degrading repeatability, in particular.

As a measure to prevent this flow of air from reaching the weighing pan, a balance including a double windshield has been conventionally known in which inside a windshield, another windshield that covers the weighing pan is additionally provided. However, in the double windshield, sliding doors are provided respectively for an inner windshield and an outer windshield. Hence, in weighing, opening and closing operations of a sliding door must be performed twice for the inner windshield and the outer windshield, and there is a drawback that the operability is poor. In particular, the sliding door of the inner windshield is very poor in operability, because it is necessary to open and close the sliding door by reaching out by hand from the outside of the outer windshield.

In order to eliminate such poor operability, there is a balance configured to open and close at least a part of the periphery excluding a ceiling portion of the inner windshield by vertically sliding by driving of a motor, and a detection means is also provided for detecting opening and closing of sliding doors sliding in lateral directions that are provided on a pair of lateral surfaces of the outer windshield, so as to open and close the inner windshield in an interlocking manner with opening and closing of the sliding door of the outer windshield, based on a detection result of the detection means (Patent Literature 1).

CITATION LIST

Patent Literature

Patent Literature 1: Japanese Published Unexamined Utility Model Application No. H04-113029

SUMMARY OF INVENTION

Technical Problem

In the balance of Patent Literature 1, upon detection of opening and closing of the sliding door of the outer windshield that is manually opened and closed, the inner windshield is opened and closed by the motor. Hence, a rack and pinion gear for transmitting a driving force of the motor to an opening and closing portion of the inner windshield is provided on a side wall portion of the inner windshield. Accordingly, the balance of Patent Literature 1 has drawbacks that a driving force transmission mechanism including the rack and pinion gear must be provided within the double windshield, the configuration becomes complicated, and the windshield also increases in size. In addition, the balance of Patent Literature 1 has a drawback that when the motor is driven, dust may be generated from a mechanical contact part within the double windshield in the driving force transmission mechanism in accordance with activation of the driving force transmission mechanism.

In addition, in the balance of the Patent Literature 1, after detecting that the opening and closing operations of the sliding door of the outer windshield have been completed, the opening and closing operations of the opening and closing portion of the inner windshield are performed by the motor. Therefore, in weighing, it is not necessary to manually open or close the inner windshield, but the opening and closing operations of the inner windshield and the outer windshield must be performed separately, that is, the opening and closing operations must be performed twice. Here, the amount of outside air that flows into the inner windshield through the outer windshield increases in accordance with the length of a period of time for which the opening and closing portions of the respective windshields are open, and an increase in the inflow amount of the outside air leads to adverse effects on the repeatability that is one of indexes of weighing accuracy. In the balance of Patent Literature 1, the opening and closing operations are performed twice, and thus the opening and closing periods by the respective opening and closing portions of the double windshield are the same as those of a double windshield to be opened and closed without interlocking between the respective opening and closing portions. For this reason, in the balance of Patent Literature 1, the respective opening and closing units of the double windshield are opened and closed in an interlocking manner with each other. However, the inflow amount of the outside air cannot be reduced, as compared with a case where there is no interlocking between them, and there is another drawback that the repeatability in weighing cannot be improved.

It is an object of the present invention to provide a balance with a double windshield for which these drawbacks are eliminated.

Solution to Problem

In order to address the above drawbacks, a balance including a double windshield according to the present invention, includes a double windshield including an inner windshield that covers a weighing pan, and an outer windshield that covers the inner windshield, in which the inner windshield and the outer windshield each include a sliding door openable and closable on a lateral surface, and a linkage mechanism configured to link sliding doors positioned on the same lateral surface side so as to move in the same direction is provided on the sliding door of the inner windshield and the sliding door of the outer windshield.

The sliding doors positioned on the same lateral surface side of the inner windshield and the outer windshield are linked with each other to move in the same direction. Therefore, by opening and closing the sliding door of the outer windshield, the sliding door of the inner windshield can be opened and closed simultaneously.

In addition, the linkage mechanism may be constituted of a pair of engagement members which are engaged with each other to be disengageable from each other, may include a protrusion provided on one of the engagement members, and a recess provided in the other one of the engagement members, and may be provided such that the recess and the protrusion are relatively displaced so that the protrusion enters into and exits from the recess, and such that an engaged state is brought about when the protrusion enters, and a disengaged state is brought about when the protrusion exits.

According to this configuration, the pair of engagement members can be engaged and disengaged by entering and exiting movements of the protrusion into and from the recess. Therefore, the inner and outer sliding doors can be opened and closed simultaneously or separately in accordance with engagement and disengagement of the pair of engagement members.

Further, the engagement member on which the protrusion is provided may include a housing, and the protrusion may be provided to be capable of protruding from and retracting into the housing and may be provided to be capable of being positioned in two positions of a most protruding position and a most retracting position.

According to this configuration, the protrusion can be displaced with reliability, and the protruding position in the engaged state and retracting position in which the engaged state is disengaged are achievable with reliability. Therefore, engagement and disengagement movements of the pair of engagement members can be made easily and reliably.

Furthermore, the engagement member in which the recess is provided may include the recess at a tip end, and an engagement lever, which is capable of rising and lying, and on which a return spring is provided at a rear end, and may be provided such that, in a state in which the engagement lever is in a lying state, the protrusion enters into the recess, whereas in a state in which the engagement lever is in a rising state against a resilient force of the return string, the protrusion exits from the recess.

According to this configuration, in the engaged state of the respective engagement members, the rear end of the engagement lever is pushed down against the resilient force of the return spring, the engaged state of the respective engagement members is disengaged by raising its tip end, the pushing-down is released to restore the engagement lever to the lying state with the resilient force of the return spring, and the respective engagement members can be brought into the engaged state, so that engagement and disengagement operations can be performed easily and reliably.

Advantageous Effects of Invention

According to the present invention, the sliding doors of the inner windshield and outer windshield positioned on the same lateral surface side are linked with each other to move in the same direction. By performing opening and closing operations of the sliding door of the outer windshield, the opening and closing operations of which are easy, the sliding door of the inner windshield can be opened and closed simultaneously, thereby facilitating the opening and closing operations of the sliding doors of the double windshield. In addition, since the opening and closing operations of the sliding doors of the double windshield are simultaneously performed just once, open periods of the sliding doors of the double windshield are shortened, the inflow amount of the outside air into the double windshield is reduced, the repeatability in weighing can be improved, and in particular, accurate weighing in a high-resolution balance is enabled.

DESCRIPTION OF EMBODIMENTS

Hereinafter, a first embodiment of the present invention will be described with reference to FIGS. 1 to 6 of the accompanying drawings.

Figure 1:
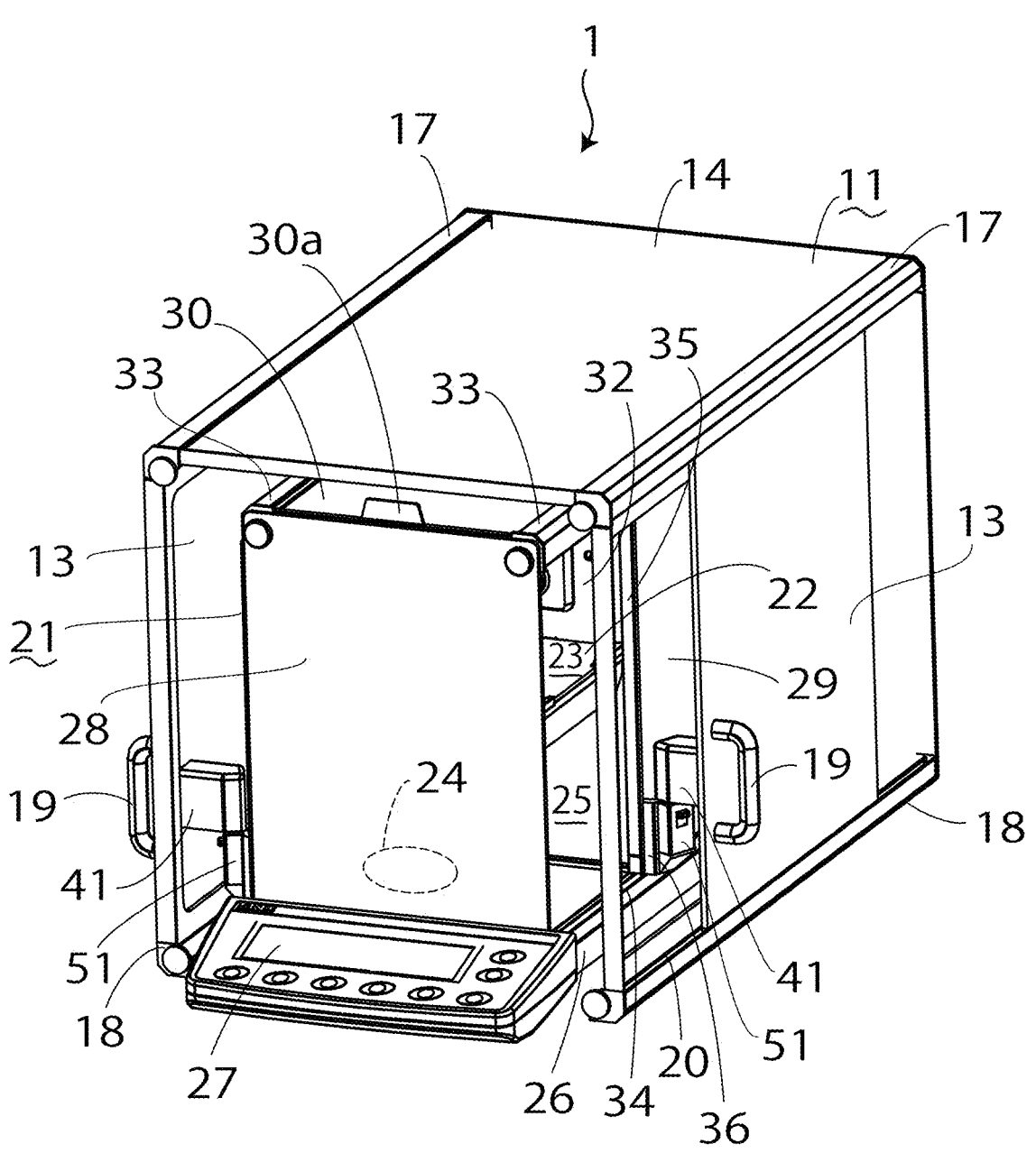
FIG. 1 is an overall perspective view illustrating a first embodiment of the present invention, with a front plate of an outer windshield omitted in illustration.
Figure 3:
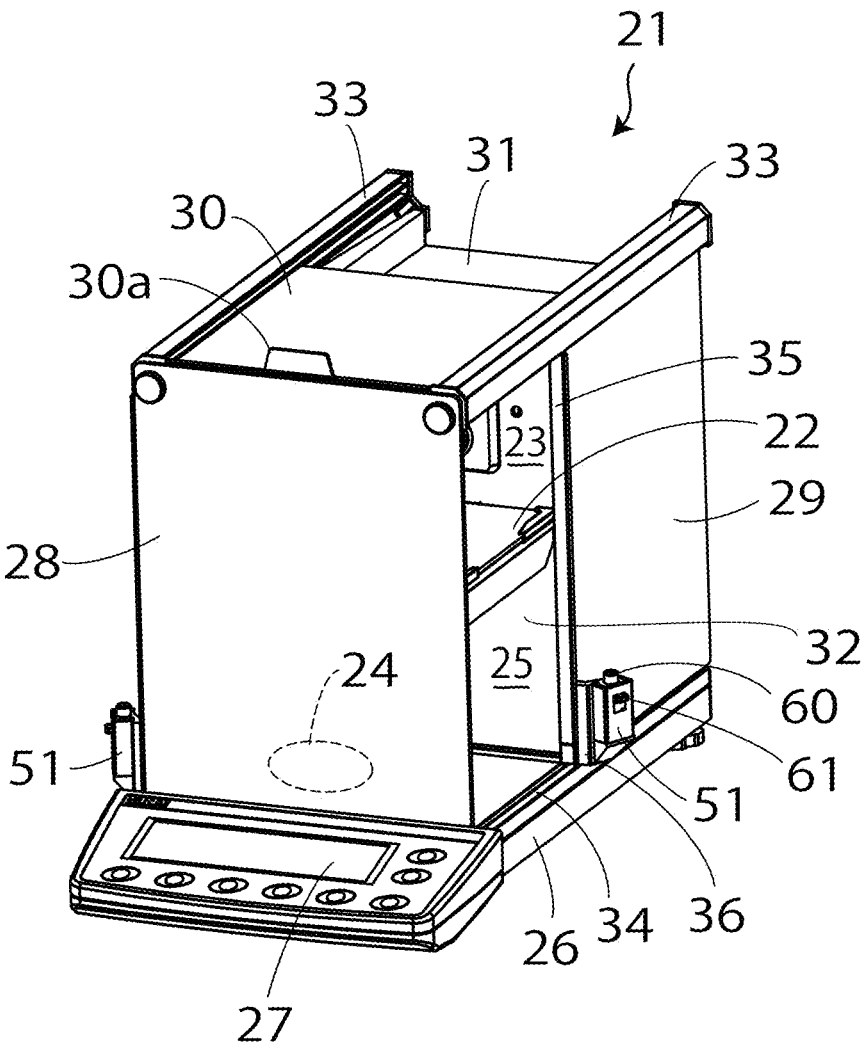
FIG. 3 is a perspective view illustrating an inner windshield of the same.

As illustrated in FIG. 1, a balance 1 includes a double windshield including an outer windshield 11 and an inner windshield 21, which is covered with the outer windshield 11. As illustrated in FIGS. 1 and 3, the inner windshield 21 is vertically partitioned by a partition plate 22, an upper portion serves as a static elimination chamber 23, and a lower portion serves as a weighing chamber 25 including a weighing pan 24, which is connected with a mass sensor (illustration is omitted) of an electromagnetic balance type or a load cell type in a casing 26, and on which a sample is to be placed. The inner windshield 21 and the outer windshield 11 prevent wind pressure from affecting weighing. The flow of air that flows into the weighing chamber 25, for example, the air of an air conditioner, the breath of a person at the time of weighing, the flow of air generated when a person walks, and the like act as wind pressure on a load-applied part with the weighing pan 24 as the center.

Figure 2:
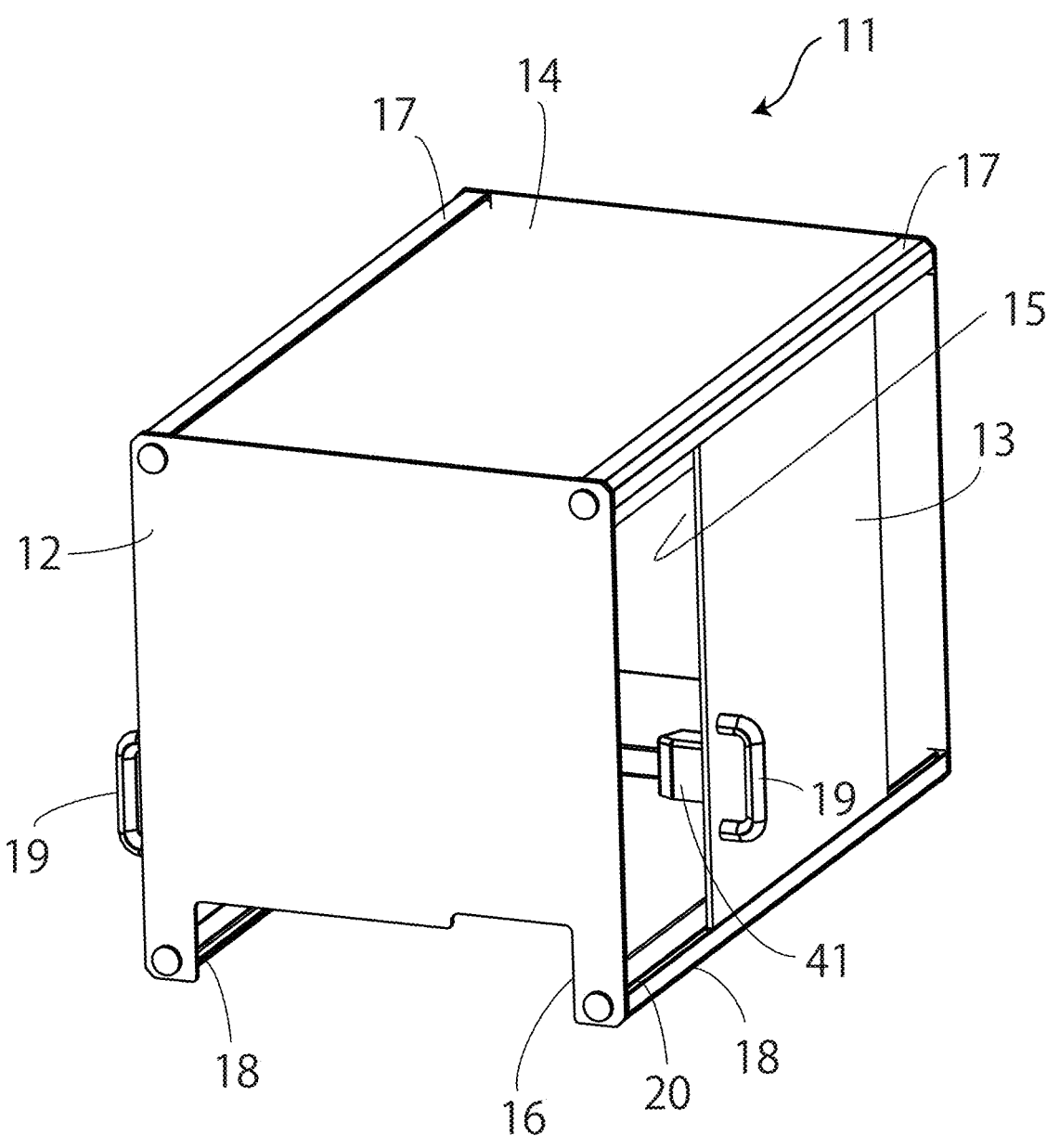
FIG. 2 is a perspective view illustrating the outer windshield of the same.

As illustrated in FIGS. 1 and 2, the outer windshield 11 includes a front plate 12 (illustration is omitted in FIG. 1), a pair of left and right sliding doors 13, 13, which respectively open and close lateral surfaces, a top plate 14, which closes a top surface, and a back plate 15, which closes a back surface, and is open at a bottom surface. A notch 16 is provided in a lower end portion of the front plate 12 so that the front surface side of the casing 26, on which a display unit 27 of the inner windshield 21 is provided, is exposed. Upper and lower ends of the respective sliding doors 13, 13 are fit into guide grooves 20, which are respectively provided in each pair of upper support frames 17, 17 and lower support frames 18, 18 (only one guide groove 20 of one of the lower support frames 18, 18 is illustrated), and the respective sliding doors 13, 13 are guided by and slid on these guide grooves 20. In addition, handles 19 are respectively provided on outer lateral surfaces of the sliding doors 13, 13. The front plate 12, the pair of sliding doors 13, 13, and the top door 14 are desirably made of glass or resin, and are desirably transparent so that an inner state can be observed. Further, in order to prevent the generation of static electricity, the glass is desirably a conductive glass provided with a conductive film on its surface, and the resin is desirably a conductive resin with conductivity.

As illustrated in FIGS. 1 and 3, the inner windshield 21 includes a front plate 28, a pair of left and right sliding doors 29 (only one of these is illustrated), which respectively open and close lateral surfaces, a top door 30, on which a knob 30a for opening and closing the top surface is provided, and a back plate 32, which forms one surface of a box-shaped housing 31, which closes a back surface. Upper and lower ends of the respective sliding doors 29 are fit into guide grooves 34, which are respectively provided in each pair of upper support frames 33, 33 and both side edges of an upper surface of the casing 26 (only one side edge of the casing 26 is illustrated), and the sliding doors 29 are guided by and slid on the guide grooves 34. In addition, the top door 30 is guided by and slid on the upper support frames 33, 33. The front plate 28, the pair of sliding doors 29, and the top door 30 are desirably made of glass or resin, and are desirably transparent so that the inner state can be observed. In addition, in order to prevent the generation of static electricity, the glass is desirably a conductive glass provided with a conductive film on its surface, and the resin is desirably a conductive resin with conductivity.

Here, description will be given with regard to a linkage mechanism for linking the sliding doors 13 and 29, which are positioned on the same lateral surface side of the outer windshield 11 and the inner windshield 21 so as to move in the same direction. However, the linkage mechanisms on the respective lateral surface sides have the same configurations. Thus, only one side will be described, and the same reference numerals are given to corresponding parts of the other side. As illustrated in FIGS. 1 to 3, the linkage mechanism consists of a pair of engagement members 41 and 51, which are respectively provided on an inner surface side of the sliding door 13 and on an outer surface side of the sliding door 29, and which are engaged with each other to be disengageable from each other.

Figure 4:
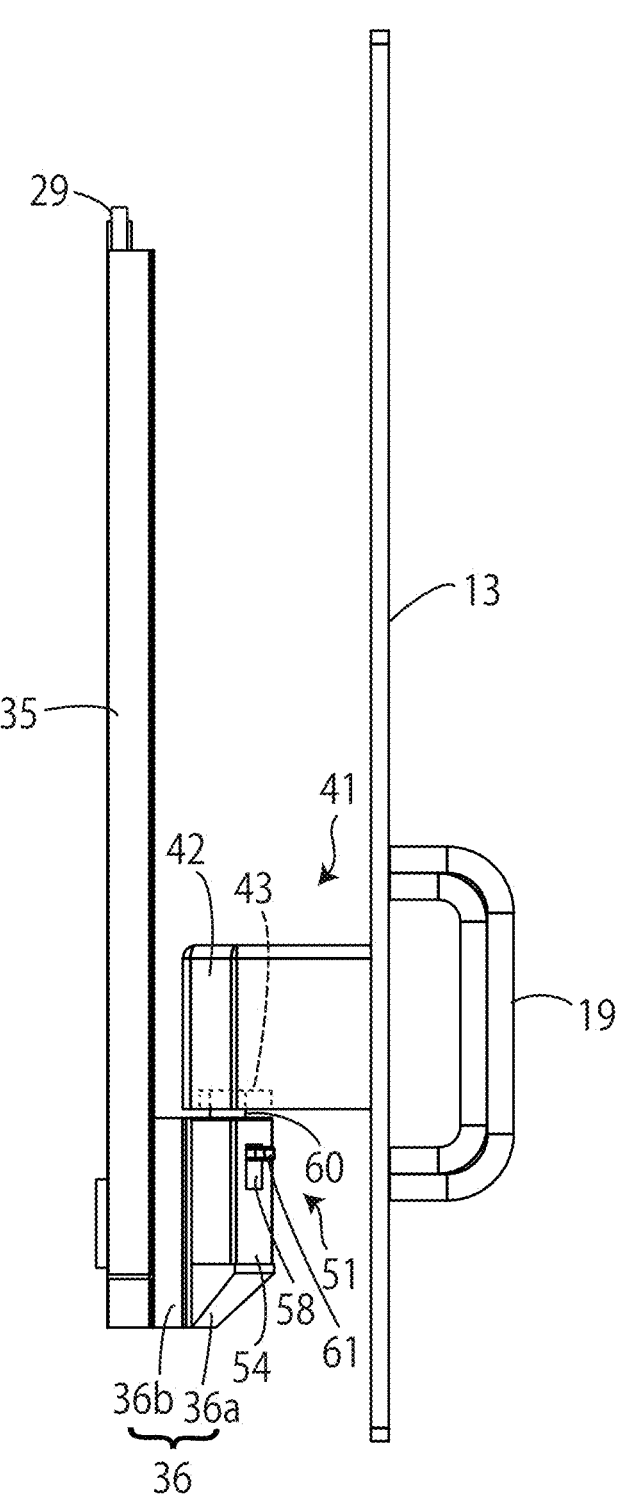
FIG. 4 is an enlarged side view illustrating an engaged state of a pair of engagement members of the same.

As can be seen in FIG. 4, the engagement member 41 provided on the sliding door 13 consists of a main body 42, which has a block shape, and which is provided on substantially a back side of the handle 19. On a lower surface of a tip end side (sliding door 29 side) of the main body 42, a recess 43 having an oval planar shape is provided. On the other hand, the engagement member 51 provided on the sliding door 29 is fixed to a mounting frame 35 of the sliding door 29 through a mounting member 36 to be inclined in a closing movement direction of the sliding door 29 with respect to the sliding door 29 so as to be obliquely positioned. The mounting member 36 consists of a fixed base 36a, on which a lower surface of the engagement member 51 is fixed, and a folded plate 36b, which is mounted and fixed to the mounting frame 35 at one end edge of one surface of two surfaces formed by being folded at an obtuse angle, and on the other surface of which the back surface of the engagement member 51 is fixed.

Figure 5:
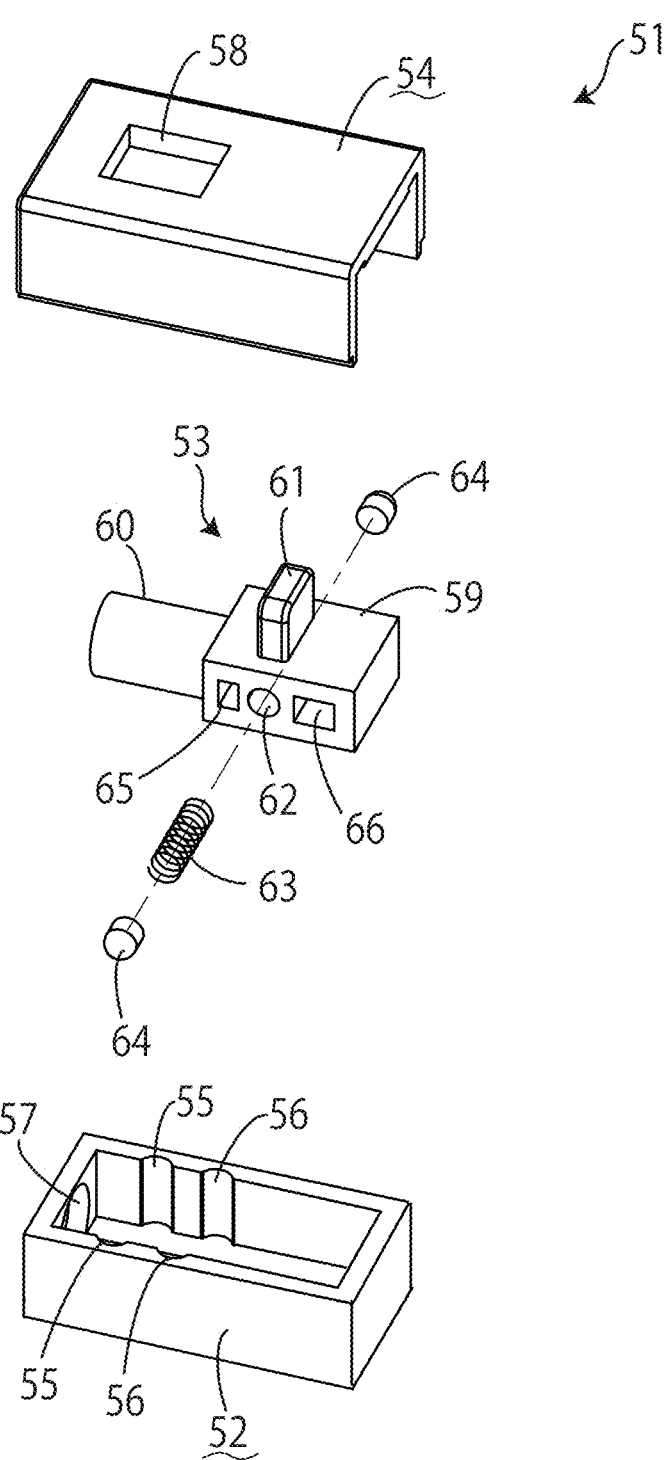
FIG. 5 is an exploded perspective view of an engagement member including a protrusion of the same.

As illustrated in FIG. 5, the engagement member 51 consists of a housing main body 52, one surface of which is open, a movable body 53, which is disposed inside the housing main body 52 to be slidable in its longitudinal direction, and a housing cover 54, which has a letter U-shaped cross-section, which is fitted and attached to the housing main body 52 to close such an open surface of the housing main body 52. The housing main body 52 and the housing cover 54 constitute a housing. Recessed grooves 55, 55 and 56, 56 each having a semicircular cross-section are formed to be spaced apart from each other in the longitudinal direction on a pair of inner surfaces that face each other on side walls of the housing main body 52. A circular opening 57 is provided in one side wall positioned at an end in the longitudinal direction of the housing main body 52. In addition, a through hole 58 having a rectangular shape is provided in the housing cover 54.

The movable body 53 includes a main body 59 having a rectangular parallelepiped shape, and in this main body 59, a protrusion 60 having a cylindrical shape and an operation knob 61 are provided. In the movable body 53, a lateral bore 62, which is positioned to correspond to the operation knob 61, and which penetrates in a lateral direction, is provided. In the lateral bore 62, positioning members 64, 64 are disposed which have a pair of hemispherical tip end portions and cylindrical base portions that are resiliently urged outward in the lateral bore 62 by a coil spring 63. The respective positioning members 64, 64 are in elastic contact with the inner surfaces of the side walls, on which the recessed grooves 55, 55 and 56, 56 of the housing main body 52 are provided, with a resilient force of the coil spring 63. In addition, the operation knob 61 protrudes from the through hole 58 of the housing cover 54, and the protrusion 60 protrudes and retracts through the circular opening 57 of the housing main body 52. In the main body 59, square bores 65, 66, which extend in parallel with the lateral bore 62, are provided to reduce the weight.

Figure 6A:
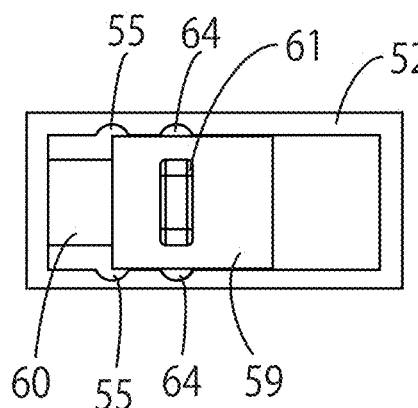
FIGS. 6A to 6C are plan views illustrating the inside of a housing for describing protruding and retracting movements of the protrusion of the same engagement member of the same.
Figure 6B:
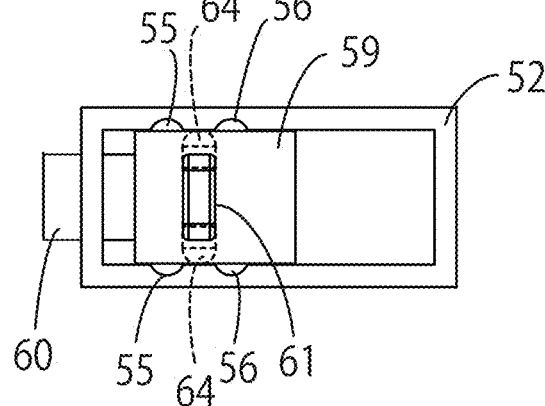
Figure 6C:
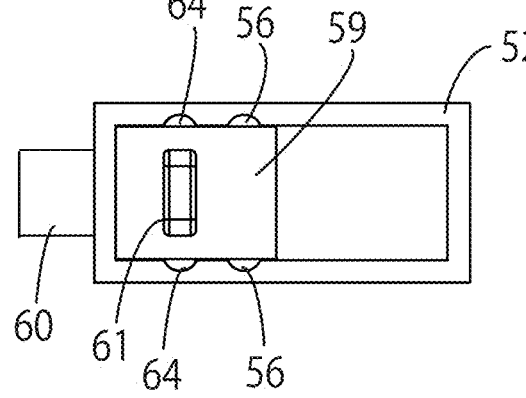

As illustrated in FIGS. 6A to 6C, by holding the operation knob 61 to move inside the through hole 58 (see FIG. 4), the movable body 59 is made to move inside the housing main body 52 while the respective positioning members 64, 64 are in elastic contact with the inner surfaces of the side walls of the housing main body 52, so that the protrusion 60 is made to protrude and retract through the circular opening 57 in accordance with a moving direction (see FIG. 5). In this movement, a state of FIG. 6C in which the respective positioning members 64, 64 are fitted with the recessed grooves 55, 55 is a most protruding position of the protrusion 60, and a state of FIG. 6A in which the respective positioning members 64, 64 are fitted with the recessed grooves 56, 56 is a most retracting position of the protrusion 60. The movable body 59 is positioned in these two positions.

Therefore, in a state in which the sliding door 13 of the outer windshield 11 and the sliding door 29 of the inner windshield 21 are both opened, the pair of engagement members 41 and 51 are positioned to correspond to each other. By moving the operation knob 61 of the engagement member 51 in the state of FIG. 6A upward in FIG. 4, the positioning members 64, 64 are disengaged from the respective recessed grooves 56, 56, are made to be fitted with the respective recessed grooves 55, 55 through the state of FIG.

6B, to be brought into the state of FIG. 6C. The protrusion 60 protrudes to the maximum from the inside of the housing main body 52, and enters into the recess 43 of the engagement member 41.

In this situation, as illustrated in FIG. 4, the engagement member 51 is provided to be inclined in the closing movement direction with respect to the sliding door 29. Thus, by inserting a hand from the open surface of the outer windshield 11, it is easy to hold the operation knob 61, and an operation for moving the operation knob 61 can be done easily and reliably. In addition, since the recess 43 has an oval planar shape, positioning of the pair of engagement members 41 and 51 is also facilitated when the protrusion 60 enters into the recess 43. This brings the pair of engagement members 41 and 51 into an engaged state. By opening and closing the sliding door 13, the sliding door 29 is also opened and closed simultaneously in an interlocking manner. Note that such opening and closing movements are manually made, but one of the sliding doors 13 and 29 may be automatically opened and closed in linkage with an appropriate driving source such as an air cylinder.

Here, with regard to weighing, as illustrated in FIG. 1, lateral surfaces on one side of the outer windshield 11 and the inner windshield 21, for example, the sliding doors 13 and 29 on the respective right lateral surfaces are opened, and a sample is placed on the weighing pan 24 from the lateral surfaces that are opened. Then, by closing the sliding door 13, the sliding door 29 is also closed simultaneously, and weighing is performed in the weighing chamber 25 in a closed state. In this weighing, since the weighing chamber 25 is in the closed state, it is not affected by the outside.

In weighing the sample, at the time of opening and closing the respective sliding doors 13 and 29 in order to place the sample on the weighing pan 24, the outside air may flow from the outer windshield 11 into the inner windshield 21. However, since opening and closing periods of the respective sliding doors 13 and 29 are the same as an opening and closing period of a single sliding door, it takes only a short period of time. Even though the air flows in, the inflow amount is extremely small. Therefore, the weighing pan 24, on which the sample is placed, is hardly affected by the flow of air, and accurate weighing can be performed.

Next, a second embodiment of the present invention will be described with reference to FIGS. 7 and 8 of the accompanying drawings.

Figure 7:
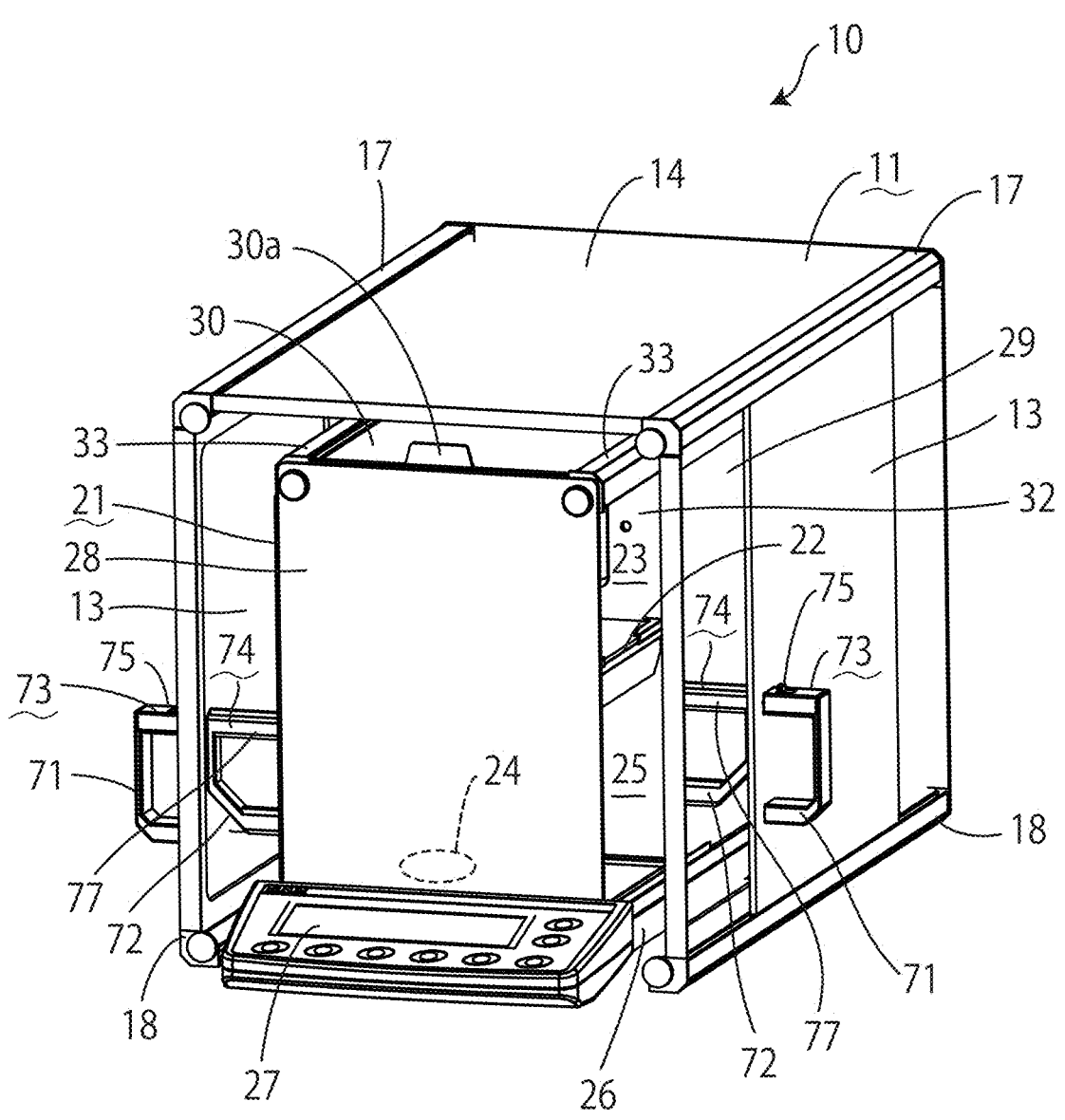
FIG. 7 is an overall perspective view illustrating a second embodiment of the present invention, with a front plate of an outer windshield omitted in illustration.

As is apparent in FIG. 7, the balance 10 in the present embodiment differs from the balance 1 in the above-described first embodiment in only the configuration of the linkage mechanism. Since the other configurations are the same, only the linkage mechanism will be described below. With regard to the other configurations, the description is omitted by applying the same reference numerals to the parts corresponding to those in the first embodiment.

Figure 8:
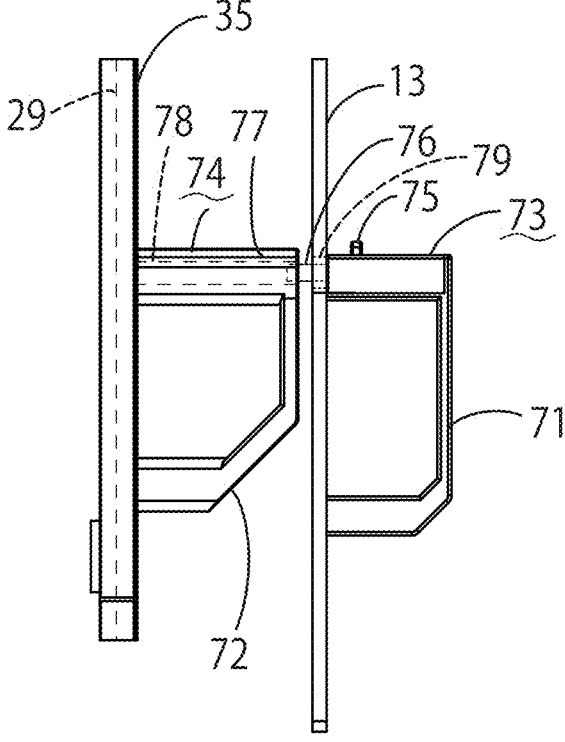
FIG. 8 is an enlarged side view illustrating an engaged state of a pair of engagement members of the same.

As illustrated in FIGS. 7 and 8, in the present embodiment, parts in handles 71 and 72, which are provided on the respective sliding doors 13 and 29 constitute a linkage mechanism. An upper horizontal part of the handle 71 of the sliding door 13 serves as one engagement member 73, and an upper horizontal part of the handle 72 of the sliding door 29, which is positioned to correspond to the engagement member 73, serves as the other engagement member 74. The engagement member 73 has the same configuration to that of the engagement member 51 in the first embodiment, has a configuration in which the engagement member 51 is laterally disposed, and includes an operation knob 75 and a protrusion 76. The protrusion 76 protrudes and retracts in accordance with the movement of the operation knob 75, in a similar manner to the above-described first embodiment. In addition, in the sliding door 13, a through hole 79, through which the protrusion 76 penetrates when the protrusion 76 protrudes and retracts, is provided. In the engagement member 74, a recess 78, which has a lateral bore shape, and into and from which the protrusion 76 having penetrated through the through hole 79 protrudes and retracts, is provided in a main body 77 having a block shape.

FIG. 8 illustrates an engaged state in which the operation knob 75 is made to move to the sliding door 13 side to the maximum (see FIG. 6C), and the protrusion 76 is brought into the most protruding position, and enters into the recess 78. On the other hand, when the operation knob 75 is made to move to a most separated position from the sliding door 13, the protrusion 76 retracts into the housing main body (not illustrated) of the engagement member 73 from the inside of the recess 78, is positioned in the most retracting position (see FIG. 6A), and is disengaged from the engaged state. The other configurations and movements of the engagement members 73 and 74 are similar to those in the first embodiment, and the description will be omitted. In the present embodiment, since the engagement member 73 including the protrusion 76 is provided on the handle 71, which is positioned on the outer lateral surface of the sliding door 13 of the outer windshield 11, the operation using the operation knob 75 is facilitated.

Next, a third embodiment of the invention will now be described with reference to FIGS. 9 to 11 of the accompanying drawings.

The present embodiment differs from the above-described first embodiment only in the configuration of the linkage mechanism and the configuration of a handle 99, which is provided on the sliding door 29. Hence, only the linkage mechanism will be described below. With regard to the other configurations, the description is omitted by applying the same reference numerals to the parts corresponding to those in the first embodiment.

Figure 9:
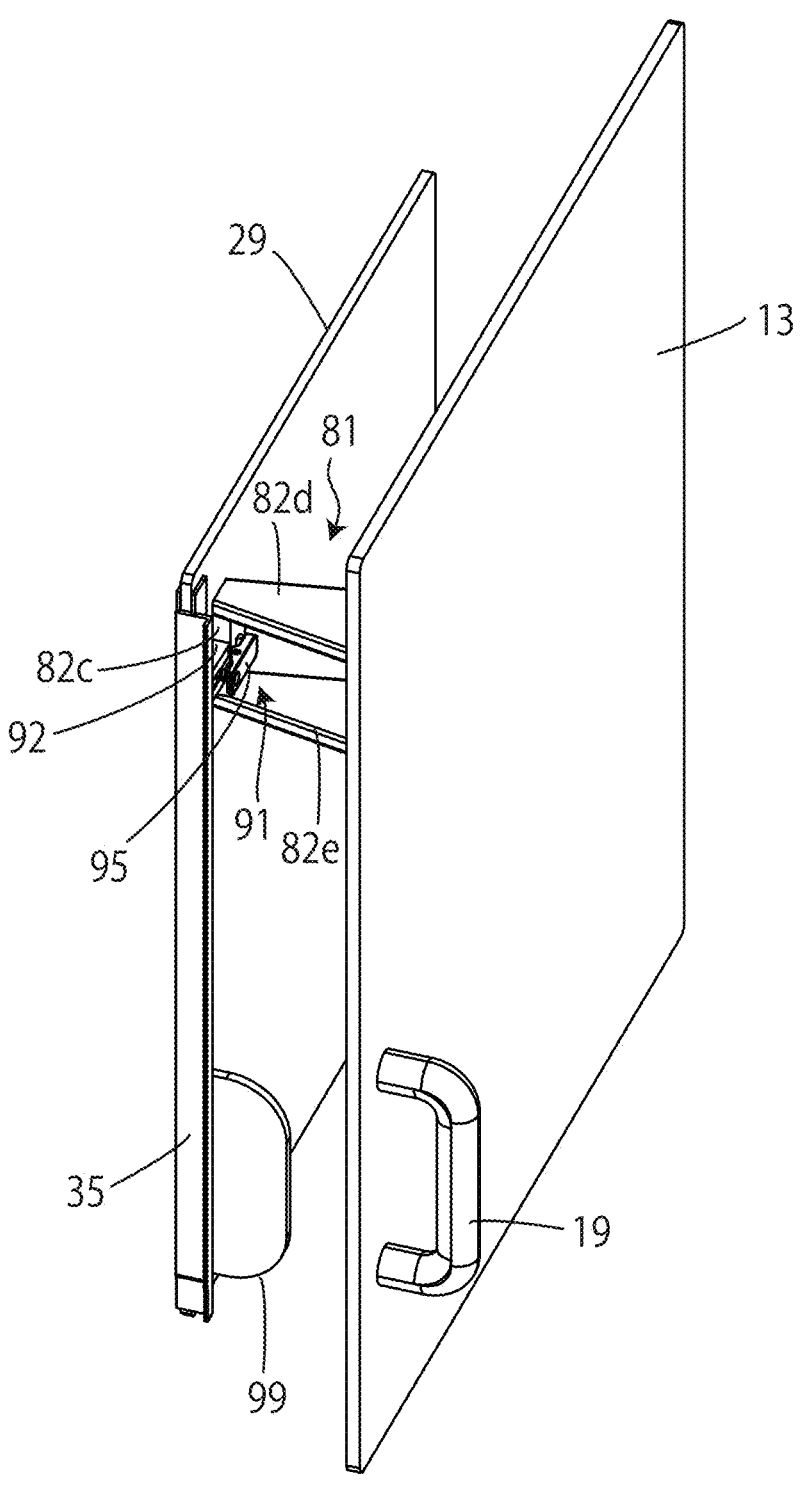
FIG. 9 is an enlarged perspective view illustrating a main portion according to a third embodiment of the present invention.
Figure 10:
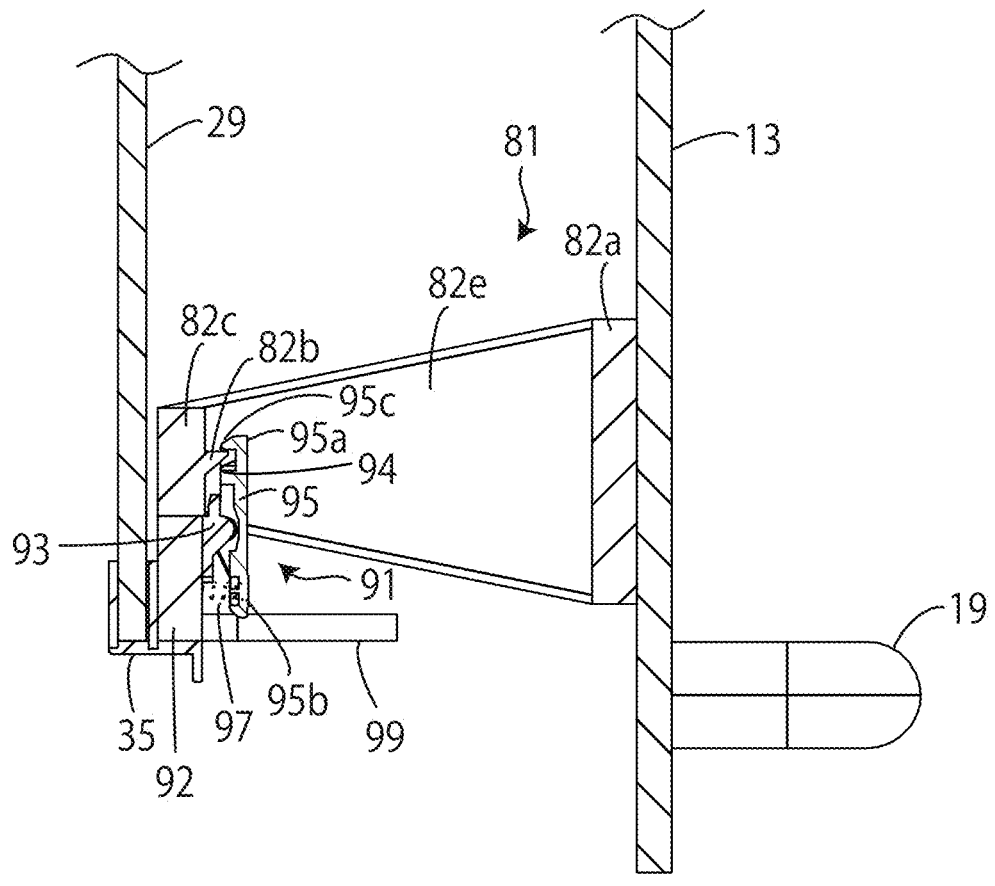
FIG. 10 is an enlarged cross-sectional view illustrating an engaged state of a pair of engagement members of the same.

As illustrated in FIGS. 9 and 10, in the present embodiment, one engagement member 81 is provided at an upper portion on one end side of the sliding door 13, on which the handle 19 is provided, and the other engagement member 91 is provided on an upper portion on one end side of the sliding door 29, on which the handle 99 is provided, and such a pair of engagement members 81 and 91 constitute a linkage mechanism. The engagement member 81 consists of a fixed plate 82a, which has a rectangular shape, and which is fixed to the sliding door 13, an engagement plate 82c, which faces the fixed plate 82a, which is positioned in close proximity to the sliding door 29, which is provided with a protrusion 82b protruding toward the fixed plate 82a, and which has a rectangular shape smaller in width than the fixed plate 82a, and an upper connection plate 82d and a lower connection plate 82e, each of which has a trapezoidal shape, and which connect the fixed plate 82a and the engagement plate 82c. As can be seen in FIG. 10, the protrusion 82b is a projection having a right-angled triangular cross-section, and a surface in an opening movement direction of the sliding door 13 serves as a vertical engagement surface, and a surface in a closing movement direction of the sliding door 13 serves as an inclined guide surface.

Figure 11:
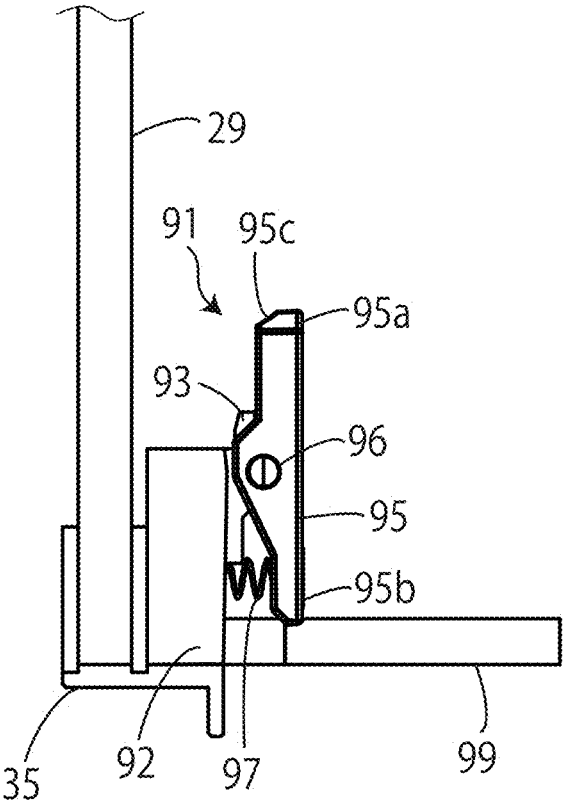
FIG. 11 is an enlarged plan view illustrating a fixed state of one of the engagement members to a sliding door of the inner windshield of the same.

As illustrated in FIGS. 10 and 11, in the other engagement member 91, a support base 93 is fixed to a fixed base 92, which is fixed to the mounting frame 35 of the sliding door 29, and which is substantially the same in thickness to the engagement plate 82c. On the support base 93, an engagement lever 95, in which a recess 94 is provided at a tip end 95a for the protrusion 82b to enter into and exit from, is supported to be capable of rising and lying by a shaft 96. In the engagement lever 95, a return spring 97 is disposed, at a rear end 95b on a side opposite to the recess 94, between the engagement lever 95 and the fixed base 92. In addition, a lower portion of a tip end surface of the engagement lever 95 is provided as an inclined surface 95c, which follows the inclined guide surface of the protrusion 82b. When a rear end 95b of the engagement lever 95 is pushed down against a resilient force of the return spring 97, the tip end 95a rises, and when the pushing-down is released, the engagement lever 95 returns to an original position with the resilient force of the return spring 97. The state of FIG. 10 is an engaged state in which the fixed base 92 and the engagement plate 82c are joined together, and the protrusion 82b enters into the recess 94.

In the above configuration, when the respective sliding doors 13 and 29 are moved so that the engagement plate 82c and the fixed base 92 approach each other, the inclined surface 95c of the engagement lever 95 is joined to the inclined guide surface of the protrusion 82b, and moves pushing up a tip end of the engagement lever 95 against the resilient force of the return spring 97. Then, when the inclined surface 95c moves over the inclined guide surface of the protrusion 82b, the protrusion 82b of the engagement plate 82c starts to enter into the recess 94 of the engagement lever 95. Then, when the engagement lever 95 returns to the original position with the resilient force of the return spring 97, the vertical engagement surface of the protrusion 82b is joined to an inner surface on the tip end side of the recess 94, and is brought into the engaged state in which the protrusion 82b enters into the recess 94. In this engaged state, when the sliding door 13 is moved in an opening direction (upward in FIG. 10), the engagement plate 82c moves in the same direction, the engagement lever 95 is moved in the same direction by the protrusion 82b, and the support base 93 and the fixed base 92 are also moved in the same direction. Therefore, the sliding door 29 is also moved in the opening direction and the sliding doors 13 and 29 are opened simultaneously.

On the other hand, in a state in which the sliding doors 13 and 29 are opened, when the sliding door 13 is moved in a closing direction (downward in FIG. 10), the inclined guide surface of the protrusion 82b is brought into a state of being joined to an inner surface on a rear end side of the recess 94 of the engagement lever 95. In this state, even when the sliding door 13 is further moved in the closing direction, a pushing force of the protrusion 82b against the inner surface on the rear end side is not sufficiently transmitted. However, in this state, the end face of the engagement plate 82c is in an engaged state of being joined to the end face of the fixed base 92. Therefore, the engagement plate 82c directly pushes to move the fixed base 92, which can move the sliding door 29 simultaneously in the same direction to the sliding door 13. This brings the respective sliding doors 13 and 29 into a closed state.

Note that in the present embodiment, instead of a right-angled triangular cross-sectional shape, in a case where the protrusion 82b has a columnar shape or a prismatic shape such as a hexagonal prism, it is possible to achieve reliable interlocking of the respective sliding doors 13 and 29 without relying on a pushing force of the engagement plate 82c against the fixed base 92, also in the movement of the sliding door 13 in the closing direction. In this case, with regard to the protrusion 82b entering into the recess 94, the rear end 95a of the engagement lever 95 is pushed down, and then the pushing-down is released, so that a rising and lying movement of the engagement lever 95 needs to be performed with the shaft 96 as a fulcrum.

Next, a fourth embodiment of the invention will be described with reference to FIGS. 12 and 13 of the accompanying drawings.

The present embodiment differs from the above-described first embodiment only in the configuration of the linkage mechanism. Hence, only the linkage mechanism will be described below. With regard to the other configurations, the description is omitted by applying the same reference numerals to the parts corresponding to those in the first embodiment.

Figure 12:
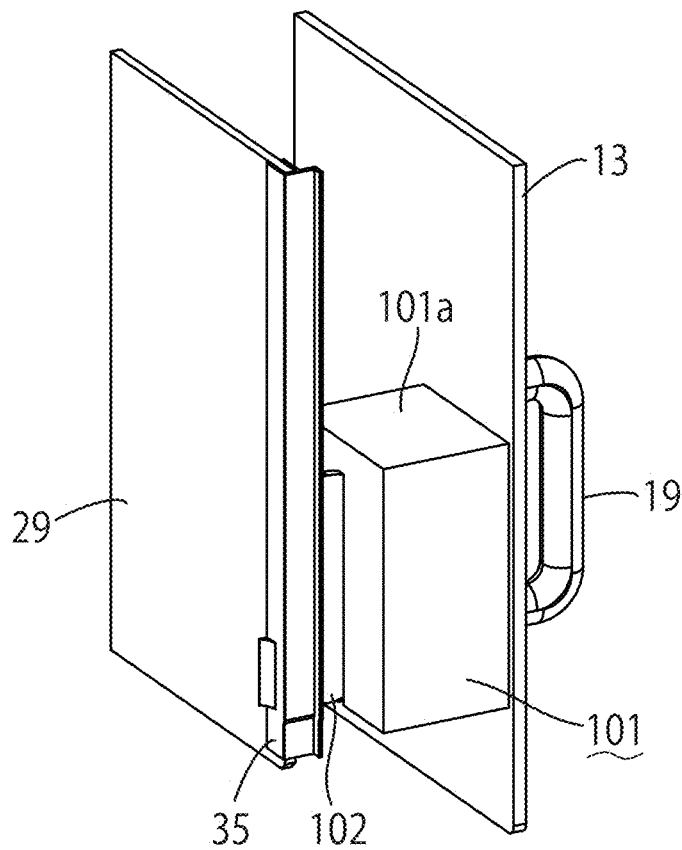
FIG. 12 is an enlarged perspective view illustrating a main portion according to a fourth embodiment of the present invention.
Figure 13:
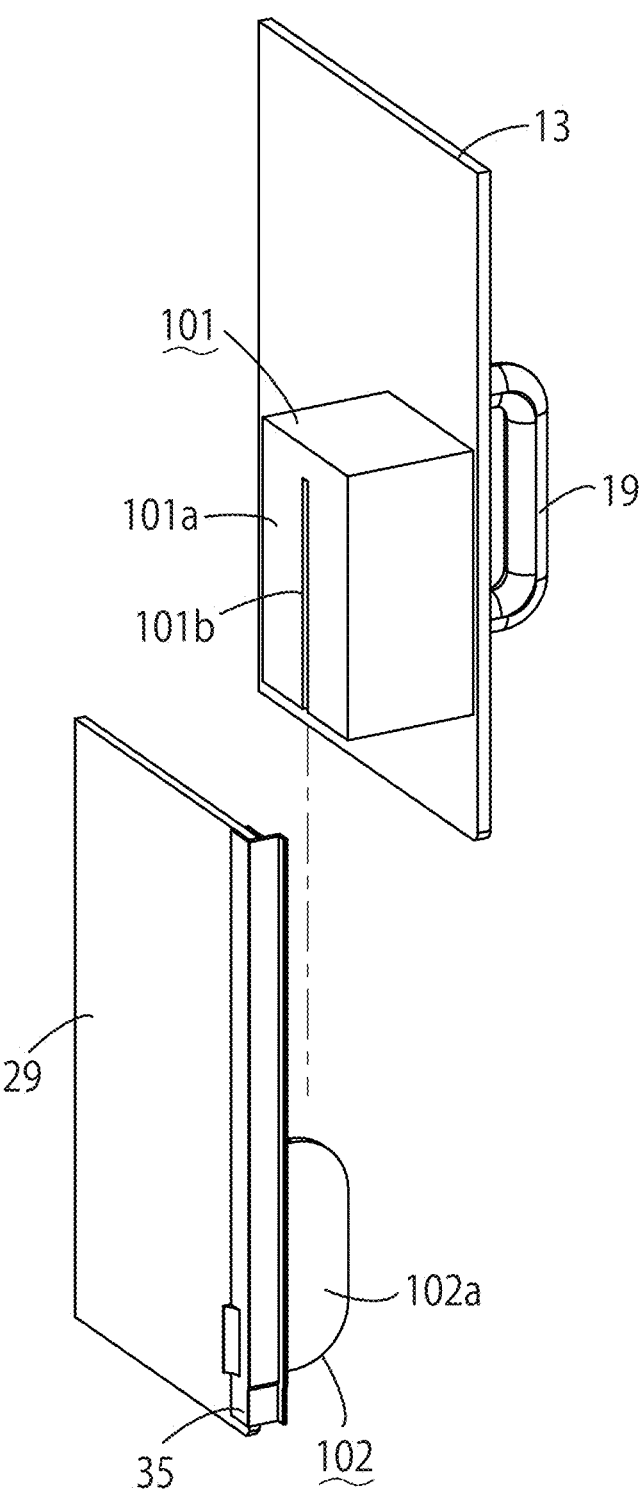
FIG. 13 is an enlarged perspective view illustrating engaged and disengaged states of a pair of engagement members of the same.

As illustrated in FIGS. 12 and 13, in the present embodiment, one engagement member 101 including a recess is provided on a back surface side of a part of the sliding door 13 on which the handle 19 is provided, the other engagement member including a protrusion is configured with a handle 102 of the sliding door 29, and such a pair of engagement members 101 and 102 constitute a linkage mechanism. In the engagement member 101, a slit 101b, which is a recess, is provided on an engagement body 101a, which is made of silicone rubber having a rectangular parallelepiped shape fixed to the sliding door 13. Such a slit 101b has a width, a depth, and a length that allows a tip end portion 102a to enter, which constitutes a protrusion of the handle 102 that is an engagement member. In addition, a lower end of the slit 101b is formed to be larger in width than the tip end portion 102a in order to facilitate entering of the tip end portion 102a.

In the above configuration, in a case where the inner windshield is covered with the outer windshield, as illustrated in FIG. 13, the slit 101b of the engagement body 101a is positioned to correspond to the tip end portion 102a of the handle 102, the engagement body 101a is moved downward so that the tip end portion 102a enters from a lower end of the slit 101b to be brought into an engaged state, so that the sliding door 13 and the sliding door 29 are brought into a linked state as illustrated in FIG. 12. In this linked state, by opening and closing the sliding door 13, it becomes possible to open and close the sliding door 29 in an interlocking manner simultaneously.

Note that the present invention is not limited to each of the above-described embodiments. For example, instead of the engagement member 51 in the first embodiment, a feed screw mechanism consisting of a nut and a screw shaft may be provided in the housing main body 52, so that the circumferential surface of the nut may be exposed from the window 58 of the housing cover 54, the nut may be rotated in a predetermined direction to reciprocate the screw shaft in the axial direction, to protrude from and retract into the housing main body 52, and to enter into or exit from the recess 43 of the engagement member 41. In addition, in the respective sliding doors 13 and 29, engagement bodies may be provided so that the lateral surfaces positioned to be perpendicular to the opening and closing direction face each other, and magnets may be provided on the opposite surfaces of the engagement bodies to connect the sliding doors 13 and 29 with a magnetic force.

Furthermore, the configurations of the outer windshield 11 and the inner windshield 21 are not limited to the above-described ones. In addition, the sliding doors 13 and 29, which are linked with each other, are not limited to a pair of left and right ones, but only one of the same lateral surface sides may be provided. Further, the sliding doors 13 and 29 on which the engagement members 41, 51, 73, 74, 81 and 91 are provided may be reversed. Furthermore, instead of the above-described combinations of the outer windshield 11 and the inner windshield 21, a windshield including four lateral surfaces and a top surface to surround and close the weighing pan 24 may be provided inside the inner windshield 21, so that at least one of a pair of lateral surfaces of the four lateral surfaces facing the pair of sliding doors 29 of the inner windshield 21 may be made up of an openable and closable sliding door to constitute a double windshield, and the inner and outer sliding doors of such a double windshield may be linked by the above-described linkage mechanism. That is, in this configuration, the inner windshield 21 serves as an outer windshield, and a new inner windshield is provided inside the inner windshield 21.

REFERENCE SIGNS LIST

1, 10 Balance
11 Outer windshield
12 Front plate
13 Sliding door
14 Top plate
15 Back plate
19 Handle
20 Guide groove
21 Inner windshield
22 Partition plate
23 Static elimination chamber
24 Weighing pan
25 Weighing chamber
26 Casing
28 Front plate
29 Sliding door
30 Top door
32 Back plate
34 Guide groove
41 Engagement member
42 Main body
43 Recess
51 Engagement member
52 Housing main body
53 Movable body
54 Housing cover
55,56 Recessed groove
57 Circular opening
58 Through hole
59 Main body
60 Protrusion
61 Operation knob
62 Lateral bore
63 Coil spring
64 Positioning member
71, 72 Handle
73, 74 Engagement member
75 Operation knob
76 Protrusion
78 Recess
81, 91 Engagement member
82*a* Fixed plate

82*b* Protrusion
82*c* Engagement plate
92 Fixed base
93 Support base
94 Recess
95 Engagement lever
97 Return spring
101 Engagement member
101*a* Engagement body
101*b* Slit
102 Handle
102*a* Tip end portion

The invention claimed is:

1. A balance including a double windshield, comprising:
a double windshield including an inner windshield that covers a weighing pan, and an outer windshield that covers the inner windshield, wherein
the inner windshield and the outer windshield each include a sliding door openable and closable on a lateral surface, and
a linkage mechanism configured to link sliding doors positioned on the same lateral surface side so as to move in the same direction is provided on the sliding door of the inner windshield and the sliding door of the outer windshield.

2. The balance including the double windshield according to claim 1, wherein
the linkage mechanism consists of a pair of engagement members which are engaged with each other to be disengageable from each other,
includes a protrusion provided on one of the engagement members, and a recess provided in the other one of the engagement members, and
is configured such that the recess and the protrusion are relatively displaced so that the protrusion enters into and exits from the recess.

3. The balance including the double windshield according to claim 2, wherein
the engagement member on which the protrusion is provided includes a housing, and
the protrusion is provided to be capable of protruding from and retracting into the housing and to be capable of being positioned in two positions of a most protruding position and a most retracting position.

4. The balance including the double windshield according to claim 2, wherein
the engagement member in which the recess is provided includes the recess at a tip end, and an engagement lever, which is capable of rising and lying, and on which a return spring is provided at a rear end, and
is configured such that, in a state in which the engagement lever is in a lying state, the protrusion enters into the recess, whereas in a state in which the engagement lever is in a rising state against a resilient force of the return string, the protrusion exits from the recess.

\* \* \* \* \*